US012533134B2

(12) United States Patent
Harari et al.

(10) Patent No.: US 12,533,134 B2
(45) Date of Patent: Jan. 27, 2026

(54) ANASTOMOSIS DEVICE

(71) Applicant: Lydus Medical Ltd., Raanana (IL)

(72) Inventors: Boaz Harari, Ganey Tikva (IL); Orit Hameiri, Kfar Saba (IL); Dror Rosner, Holon (IL); Tal Oz, Kibbutz HaMaapil (IL); Jessica Weiss, Tel Aviv (IL)

(73) Assignee: LYDUS MEDICAL LTD., Raanana (IL)

( * ) Notice: Subject to any disclaimer, the term of this patent is extended or adjusted under 35 U.S.C. 154(b) by 339 days.

(21) Appl. No.: 18/460,867

(22) Filed: Sep. 5, 2023

(65) Prior Publication Data

US 2024/0074756 A1 Mar. 7, 2024

(30) Foreign Application Priority Data

Sep. 4, 2022 (IL) .......................... 296164

(51) Int. Cl.
*A61B 17/11* (2006.01)

(52) U.S. Cl.
CPC ....... *A61B 17/11* (2013.01); *A61B 2017/1132* (2013.01)

(58) Field of Classification Search
CPC .... A61B 2017/0472; A61B 2017/1132; A61B 2017/1107; A61B 17/11
See application file for complete search history.

(56) References Cited

U.S. PATENT DOCUMENTS

| | | | |
|---|---|---|---|
| 3,265,069 A | 8/1966 | Healey, Jr. et al. | |
| 4,744,362 A | 5/1988 | Gründler | |
| 5,330,503 A | 7/1994 | Yoon | |
| 5,417,699 A | 5/1995 | Klein et al. | |
| 5,746,757 A | 5/1998 | McGuire | |
| 2004/0199185 A1 | 10/2004 | Davignon | |
| 2005/0182427 A1 | 8/2005 | Manzo | |
| 2005/0288697 A1 | 12/2005 | Tei et al. | |
| 2006/0167485 A1 | 7/2006 | Blatter | |
| 2022/0096078 A1* | 3/2022 | Daas | A61B 17/062 |

FOREIGN PATENT DOCUMENTS

| | | |
|---|---|---|
| CN | 113749709 A | 12/2021 |
| WO | 2001067963 A2 | 9/2001 |
| WO | 2016/030877 A1 | 3/2016 |
| WO | 2016128961 A2 | 8/2016 |
| WO | 2019/142185 A1 | 7/2019 |
| WO | 2020157753 A1 | 8/2020 |

* cited by examiner

*Primary Examiner* — Darwin P Erezo
*Assistant Examiner* — Christina C Lauer
(74) *Attorney, Agent, or Firm* — Vorys, Sater, Seymour and Pease, LLP; Maryellen Feehery Hank

(57) ABSTRACT

The disclosure concerns systems for use in anastomosis of tubular biological organs within the body, particularly small tubular organs, such as blood vessels, bile duct, lymph duct, nerve ducts, epididymis, etc. The anastomosis system comprises a coupling device with a body, typically within a housing, a coupling assembly linked to the body, a plurality of suturing units within the coupling assembly, and an actuator arrangement formed within the coupling device.

15 Claims, 20 Drawing Sheets

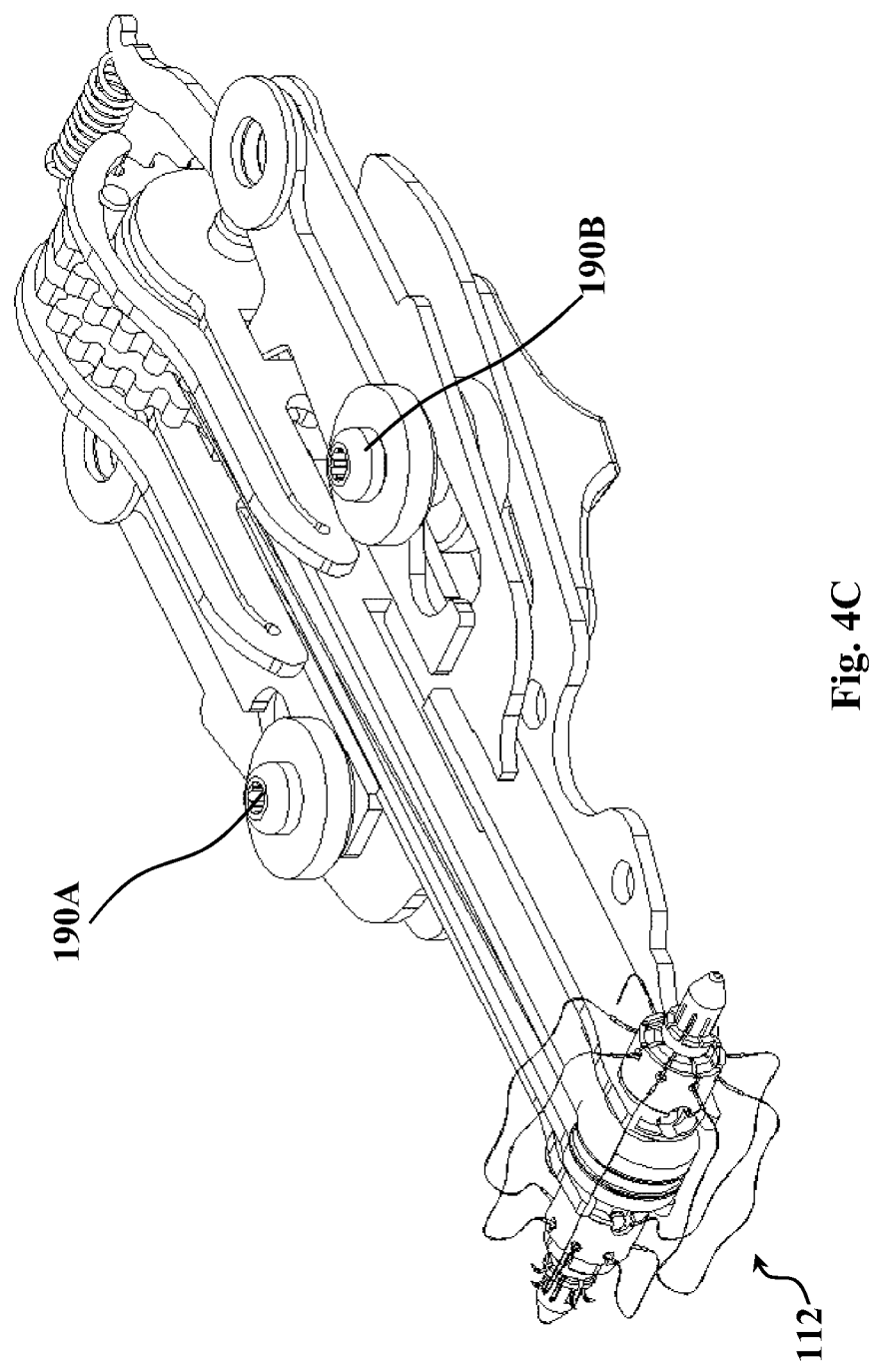

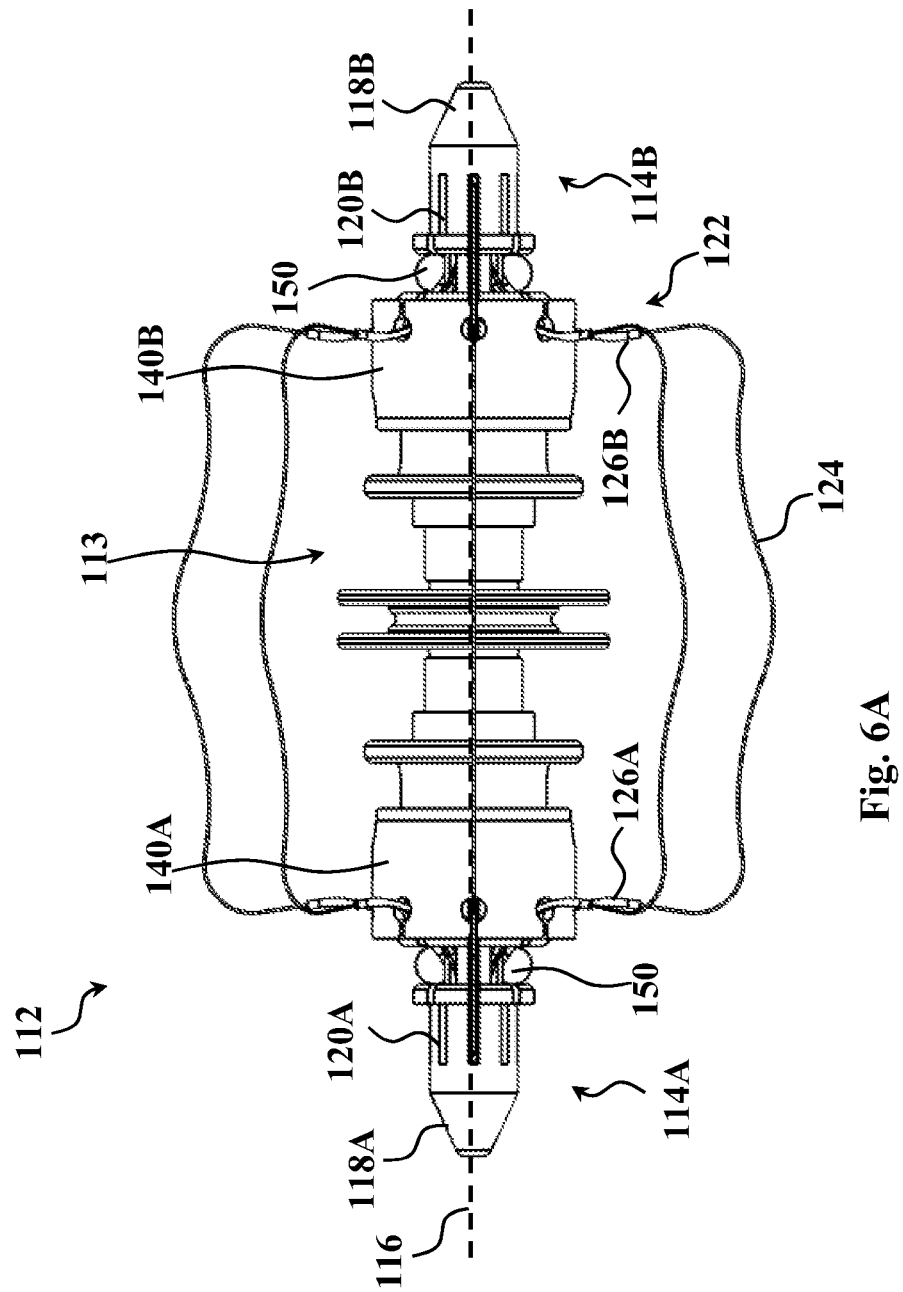

ANASTOMOSIS DEVICE

TECHNOLOGICAL FIELD

The present disclosure concerns assemblies and devices for use in anastomosis of tubular biological organs within the body, particularly small tubular organs (such as blood vessels, bile duct, lymph duct, nerve ducts, epididymis, etc.).

BACKGROUND ART

References considered to be relevant as background to the presently disclosed subject matter are listed below:
WO 2016/128961
U.S. Pat. No. 4,744,362
US 2006/0167485
US 2004/0199185
U.S. Pat. No. 5,330,503
US 2005/0288697
U.S. Pat. No. 5,746,757
U.S. Pat. No. 5,417,699
U.S. Pat. No. 3,265,069
WO 2020/157753

Acknowledgement of the above references herein is not to be inferred as meaning that these are in any way relevant to the patentability of the presently disclosed subject matter.

BACKGROUND

Various techniques are known in medical practice for the anastomosis of severed tubular organs, including blood vessels and others. WO 2016/128961 discloses, among others, anastomosis devices for the coupling of two tubular organs which make use of multiple threads, each thread having needles at its two ends, and devices that streamline the suturing procedure intended to join the two end portions of the tubular organ to one another.

An anastomosis arrangement that also makes use of a plurality of pairs of needles with a connecting thread, the needles being manipulated in a coordinated manner for an effective anastomosis procedure of vessels is disclosed in WO 2020/157753.

GENERAL DESCRIPTION

This disclosure provides anastomosis system for joining two opposite stumps of a tubular organ. The two stumps may be stumps of tubular organs, such as blood vessels or lymph vessels, e.g. cut during surgery or by accident, a stump of a grafted vessel to a matching vessel at a recipient site, etc.

Some elements of this disclosure are similar to those described in WO 2020/157753 (the "previous disclosure"), the relevant portions of which being incorporated herein by reference. In addition to such incorporation by reference, some parts of the disclosure herein are taken from the previous disclosure for the sake of completeness of the present disclosure.

The anastomosis system comprises a coupling device with a body, typically within a housing, a coupling assembly linked to the body, a plurality of suturing units within the coupling assembly, and an actuator arrangement formed within the coupling device. The system is symmetric about a longitudinal plane of symmetry, normal to the coupling axis (define below); namely, all elements on one side of the plane of symmetry are mirror symmetric to those on the other side of the plane. For ease of description, use is made of "first" to define elements on one side of the plane and "second" to define the mirror symmetric elements on the other side thereof. It should be understood that the use of "first" and "second" does not intend to denote any hierarchy or sequence.

In an anastomosis procedure, plurality of sutures is made between the opposite tissue stumps, such as arteries or veins, for joining them to one another. In the case of small vessels this may be a complex and time-consuming procedure. The system of this disclosure aims to streamline this procedure.

The system comprises a coupling assembly, defining a coupling axis, having a pair of axially symmetric stump-coupling members, joined to one another through an integral, axially extending connecting body. The stump-coupling members have opposite axial stump-coupling projections, configured for coupling with the stumps by pulling the wall of the stumps over the external surface of these projections. Pairs of the counterpart (and oppositely oriented) suturing needles, the needles of each pair being linked to one another by a common suturing thread, are part of the system and are fitted within the coupling members, with the needles' tips being accommodated within needle-receiving channels defined in the stump-coupling members. By axial displacement of a needle-manipulation element that is associated with the stump-coupling members, the needles' tips are extracted to pierce walls of the stumps fitted over the external surface of the stump-coupling projections. The needle-manipulation element is typically in the form of a sleeve fitted over the external surface of the stump-coupling member.

In the following description, the term suturing unit will be used to denote a pair of needles that are linked together by a suturing thread; and the term set of needles will be used to denote all of the suturing needles that are associated with one stump-coupling member.

The coupling assembly comprises first and second axially symmetric coupling members that define a coupling axis therealong. The first and second axially symmetric coupling members have two, respective, opposite first and second stump-coupling axial projections. Each of these projections is configured for independent coupling with one of the tissue stumps by pulling the walls of the stump over the external surface of the projection, to position the stump in a suturing state in which the stump walls cover a stump-engaging portion of the projection. Two opposite sets of first and second open channels in said first and second stump-coupling members, respectively, are arranged in an axially-symmetric manner about the coupling axis. Each of the channels extends between a rear channel end that is defined in the stump-coupling member and a front channel end defined in the stump-engaging portion of the projection, thereby defining a channel axis therebetween.

Each channel is defined between side walls, and a bottom wall that has a curved front wall portion and a curved rear wall portion. The curvatures of the two bottom wall portions, i.e. the front and the rear portions, are offset and separated by a pivot point. Each first channel in one set has a counterpart second channel in the opposite second set of channels, the corresponding first and second channels extend along the same channel axis. The coupling assembly also comprises first and second needle manipulation elements in the first and second stump-coupling members, respectively. The stump-coupling members are configured as a sliding sleeve over the external surface of the stump-coupling member, each being axially displaceable between an outer position more proximal to said stump-coupling projection, and an inner position more distal to the stump-coupling projection.

Each of the plurality of suturing units comprises a suturing thread coupled to two curved suturing needles, each curved needle having a tipped front and a thread-coupled rear. Each of the suturing needles is accommodated within one of the channels: one of the suturing needles of each suturing unit is accommodated in one of the first channels and the other suturing needle of the unit in one of the second channels. When the needle manipulation element is in its outer position, the front portion of each needle rests against the front bottom wall portion of the channel, and the rear end of the needle extending out of the channel. The rear end of the needle is coupled to the needle manipulation element, such that upon the axial displacement of the needle manipulation element from the outer position to the inner position, the needle pivots about said pivot point to rest against the rear bottom wall portion of the channel, thereby pivotally displacing the tipped front of the needle out of the channel to pierce through the stump walls when in said suturing state.

The actuator arrangement is symmetric about the plane of symmetry, which as noted above, is substantially perpendicular to the coupling axis of the coupling assembly. The actuator arrangement is held by the body. The actuator arrangement comprises first and second arms, pivotally fixed to the body about, respective, first and second pivot axes that are essentially parallel to the plane of symmetry. Each of the first and second arms is configured for coupling, at its distal portion, to the first and second needle manipulation elements, respectively. Each of the arms can be moved independently from an initial state to a tissue piercing state, causing a distal portion of the respective arm to move towards the plane of symmetry to axially displace the respective needle manipulation element from the outer position to the inner position. The actuator arrangement has first and second actuation elements, each being independently reciprocally displaceable generally in the proximal-distal direction, and, respectively, associated with the first and second arms. During such reciprocation, the arms are caused to pivot between a rest state and an actuating state, inducing the respective needle manipulation elements to displace between the outer position and the inner position.

By one embodiment, the displacement of the actuation element in the proximal to distal direction causes the arms to pivot between said rest and said actuation state, respectively. The first and second actuation elements can have, respective, first and second pins that are received and reciprocate within, respective, first and second guiding grooves defined within the body to guide the reciprocal displacement of the actuation elements. The pins may also be received within, respective, first and second arm grooves defined within the first and second arms, with each of the arm grooves being offset vis-à-vis the respective guiding groove, whereby the reciprocation of the actuating element induces pivotal movement of the respective arm.

By an embodiment, the system comprises a wheel element linked to the coupling assembly, and rotatable about a wheel axis extending essentially parallel to the coupling axis. Rotation of the wheel element causes rotation of the coupling assembly about the coupling axis. The wheel element may be linked to the coupling assembly, according to an embodiment, through a closed-loop band or ring that transfers the rotational movement of the wheel to the coupling assembly. It should be noted, however, that other arrangements for linking the wheel to the coupling assembly can be used, such as coupling through a cogwheel system.

According to an embodiment of this disclosure, the pivot axes are positioned at rear portions of the arms.

The anastomosis device that comprises a wheel element may also comprise first and second wheel-engaging levers, independently pivotable between a blocking state and an unblocking state about the first and second pivot axes, respectively. The wheel-engaging levers of this embodiment have, respective, first and second protrusions that extend laterally towards the wheel. The wheel can have first and second receptacles configured to receive the respective first and second protrusions, such that once received in the receptacles, the wheel is rotatably fixed in a position defined herein as the "zero position". The zero position is useful to ensure that the two needles of a suturing unit, that are linked by a common suturing thread, are piercing and engaging opposite aligned portions of the two tissue stumps.

When performing an anastomosis procedure, one set of first needles are manipulated to pierce through the walls of the respective stump, and then the stump may be axially rotated via rotation of the wheel to permit the medical practitioner access to the other needles around the perimeter of the stumps, so as to pull the needles further through the stump walls, pulling the suture thread therewith. In order to ensure that the second needles will pierce opposite locations to those of the first needles in the opposite stump, the wheel is returned to the zero position, which will ensure proper needles alignment (namely, the needles in each suturing unit need to be inserted into the tissue aligned to one another as to minimize application of tension or torque on the stumps). As will be further elucidated below, according to some embodiments, manipulation of the needles to pierce through the walls of the stumps, in the manner described, can only be achieved when the wheel element is in the zero position.

By an embodiment, the wheel-engaging levers are pivoted between the engaging state and the releasing state by the displacement of the respective actuation elements. The pivotal movement of the wheel-engaging lever from the unblocking state to the blocking state is typically against the biasing force of an urging element, urging the lever to move into the unblocking state. The wheel-engaging lever can have a bearing edge, opposite said protrusion, that bears onto the pin. The bearing edge can have a displacement arresting portion configured, such that the displacement of the pin in the proximal to distal direction induces a pivotal displacement of the lever into the blocking state; namely, the proximal-to-distal displacement is prevented when the wheel is not in the zero position.

The bearing edge can comprise a recess distal to the displacement arresting portion that permits the wheel-engaging lever to pivotally displace into the unblocking state. The displacement arresting portion may be configured such that the displacement of the pin in the distal to proximal direction induces a pivotal displacement of the lever into the blocking state, such pivotal displacement being disabled when the wheel is not in the zero position.

According to an embodiment, the needles are retained within the channels by a retaining element. The retaining element can be an elastic ring that is accommodated in a circumferential groove defined on the stump-coupling projection. The elastic ring can have a diameter such that it can fit snugly into the circumferential groove, and an integral gripping portion for gripping and pulling a portion of the ring out of the groove. The elastic ring can also comprise a notch for cutting the ring.

An elastic ring of the kind described above with the integral gripping portion and the notch is also an aspect of the present disclosure.

BRIEF DESCRIPTION OF THE DRAWINGS

To better understand the subject matter that is disclosed herein and to exemplify how it may be carried out in practice, embodiments will now be described, by way of non-limiting example only, with reference to the accompanying drawings, in which:

FIGS. 4C and 4D are, respective, perspective and planar bottom views of the system with one of the needle manipulation elements being at its inner position and the needles at their piercing state.

FIGS. 6A and 6B are a side view and a longitudinal cross-sectional view, respectively, of a coupling assembly according to an embodiment of this disclosure.

DETAILED DESCRIPTION OF EMBODIMENTS

In the following description, the terms "top" and "bottom" are used to denote the normal operational state of the system, with the top side of the device being that facing the practitioner during the use of the system.

As can be appreciated, the embodiments to be described below are meant to illustrate the general principles of the arrangement, assembly and devices disclosed herein and are not limited to the specifics of these embodiments. When discussing some of the elements, some potential modifications may be mentioned. However, modifications may also be possible, as appreciated by a person of skill in the art, also in elements in connection with which modifications are not specifically discussed herein, all within the general teachings of this disclosure.

Figure 1:
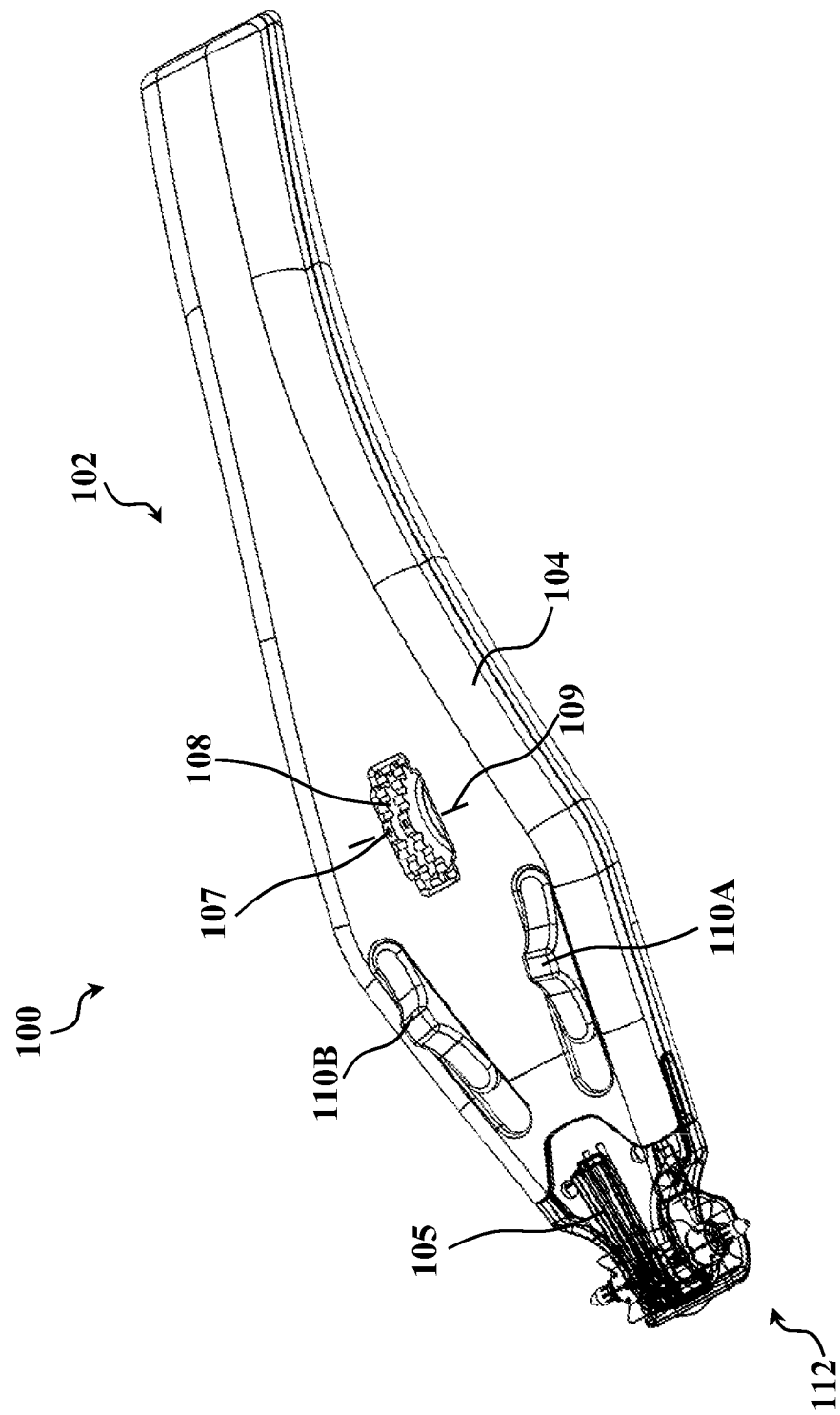
FIG. 1 is a perspective view of the anastomosis system according to an embodiment of this disclosure.

Reference is first made to FIG. 1, showing the anastomosis system according to an embodiment of this disclosure.

System 100 includes a device 102 and a coupling arrangement 112. The device 102 has a housing 104 housing the device's body 106 (seen in FIG. 2A and onwards). Visible are the upper portion of wheel element 108, and the first and second actuation elements 110A, 110B, the function of which will be explained below. Zero marks 107 are visible on top of wheel element 108 which when aligned with marks 109 on the body, provide a visual indication of the Zero position, as will be further described below.

Figure 2A:
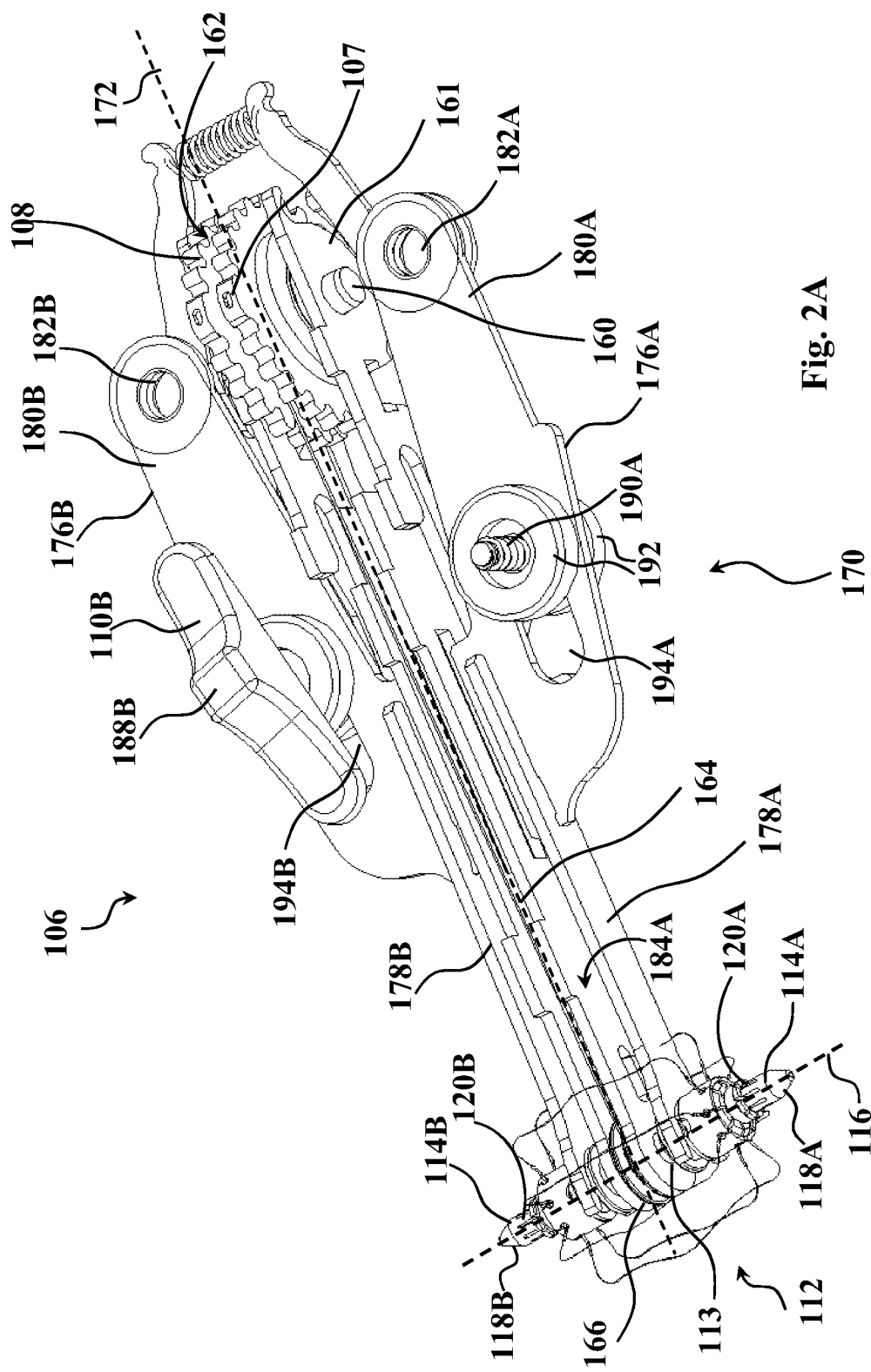
FIGS. 2A and 2B are, respectively, are top and bottom perspective views, respectively, of the system of FIG. 1 in an initial state, with the housing removed for ease of viewing of internal elements.
Figure 2B:
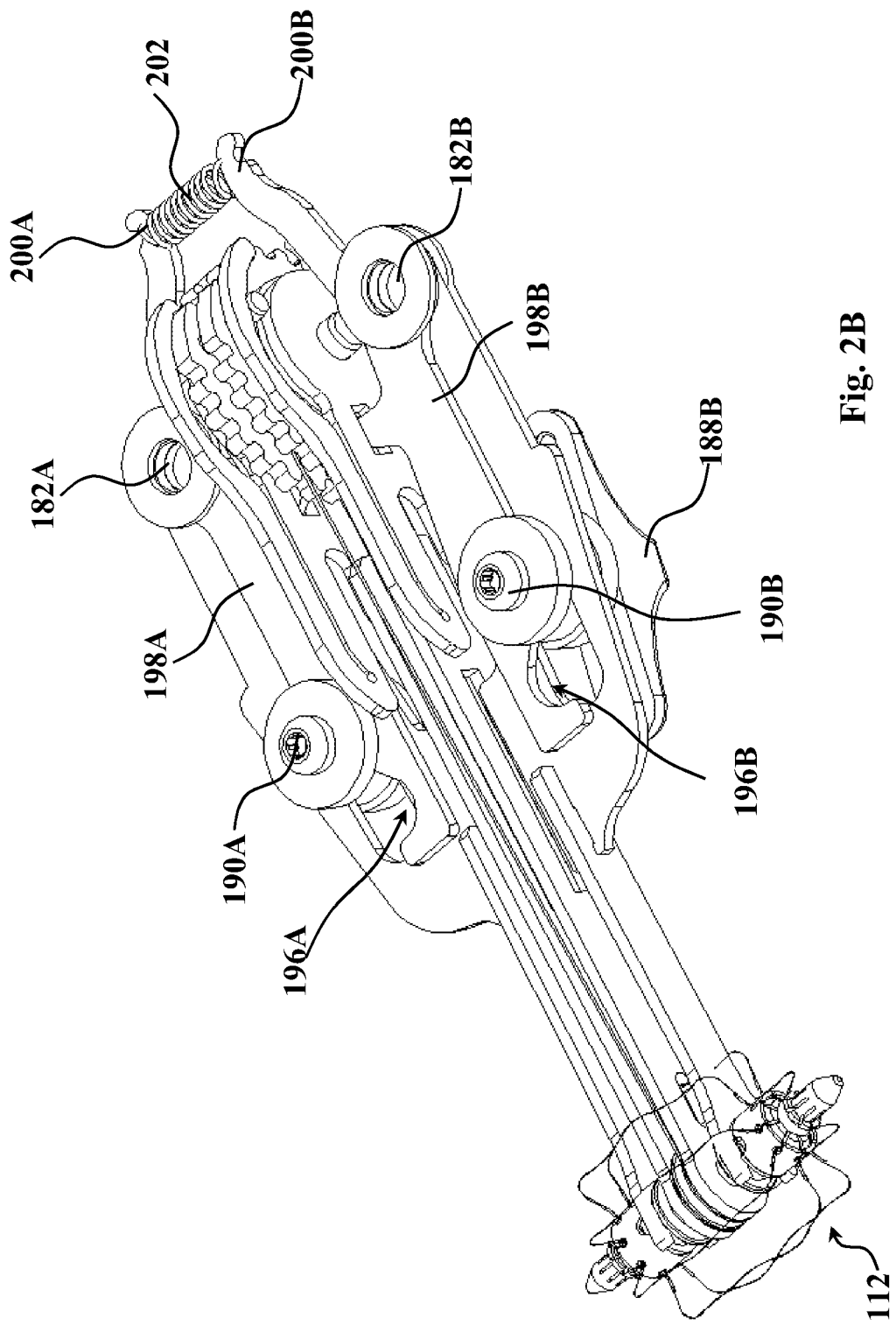
Figure 2C:
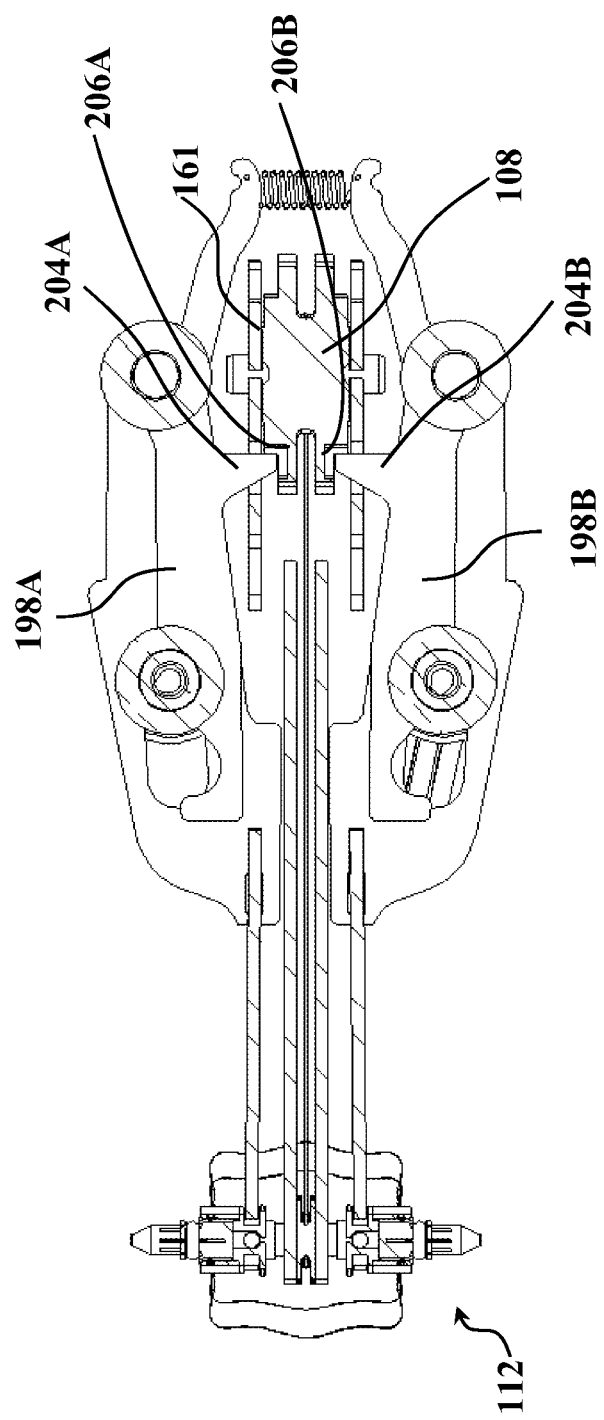
FIG. 2C is a planar cross-section of the device of FIG. 2B.
Figure 3A:
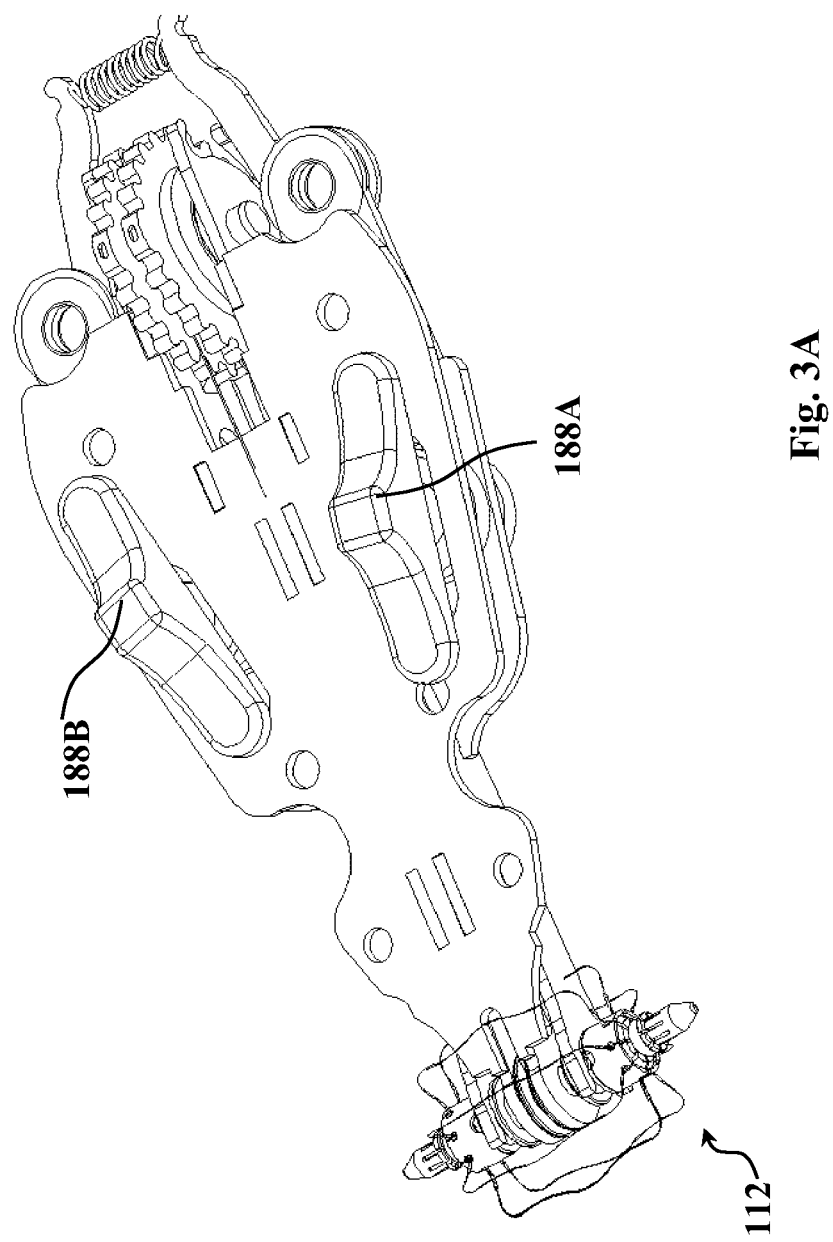
FIGS. 3A and 3B are, respective, perspective and planar top views of the system at an intermediate operational state.
Figure 3B:
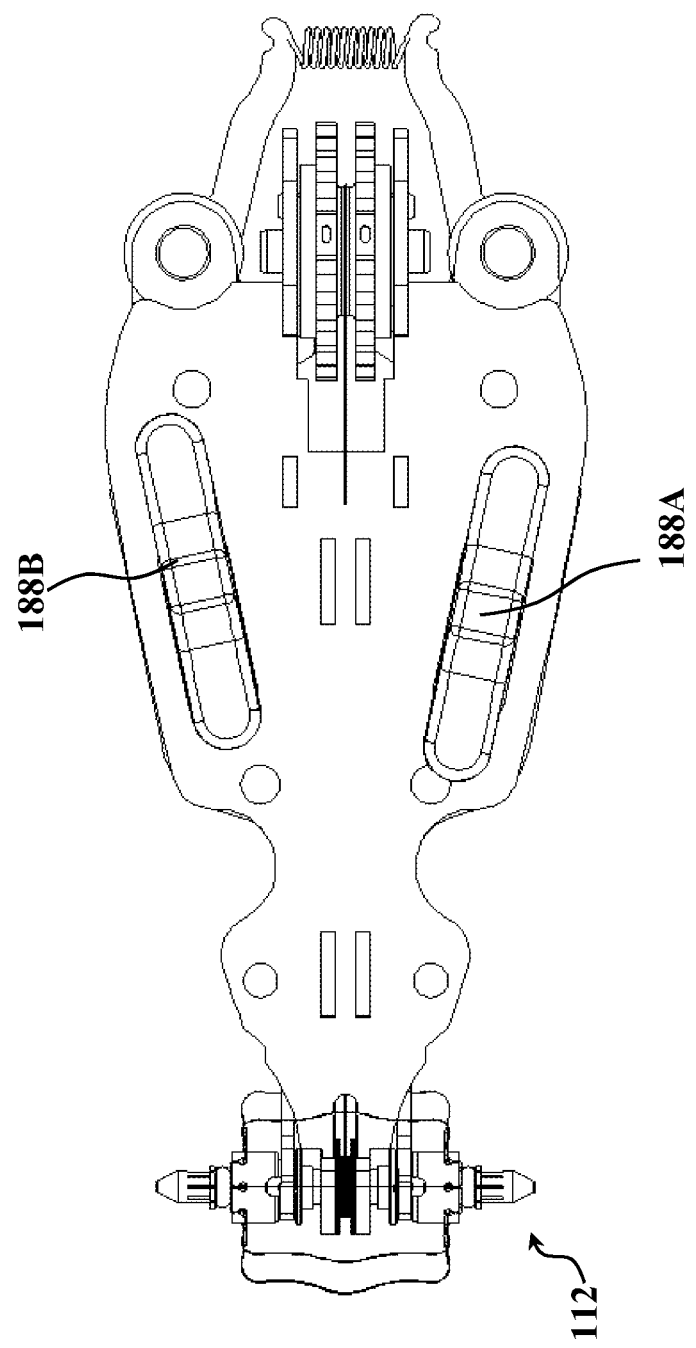
Figure 3C:
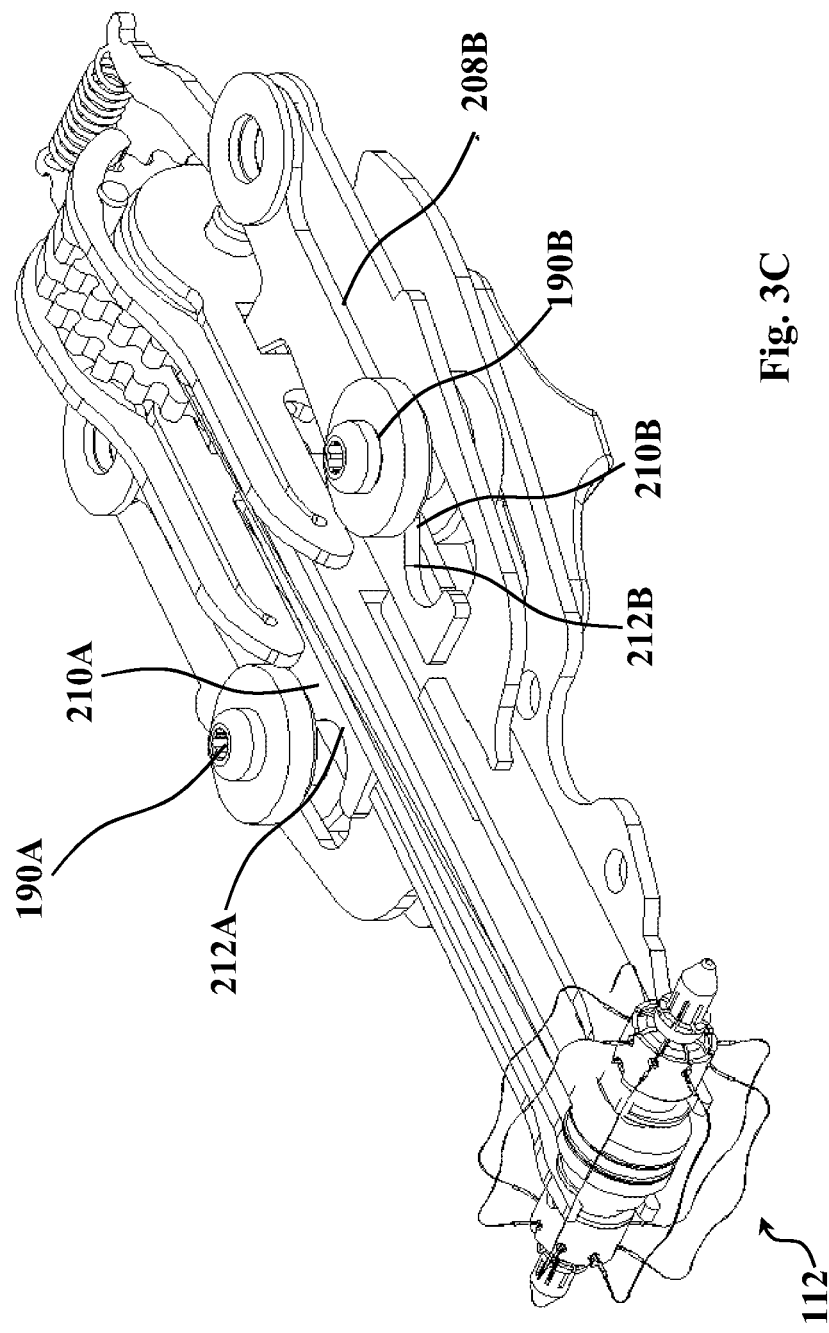
FIGS. 3C and 3D are, respective, perspective and planar bottom views of the system at the intermediate operational state.
Figure 3D:
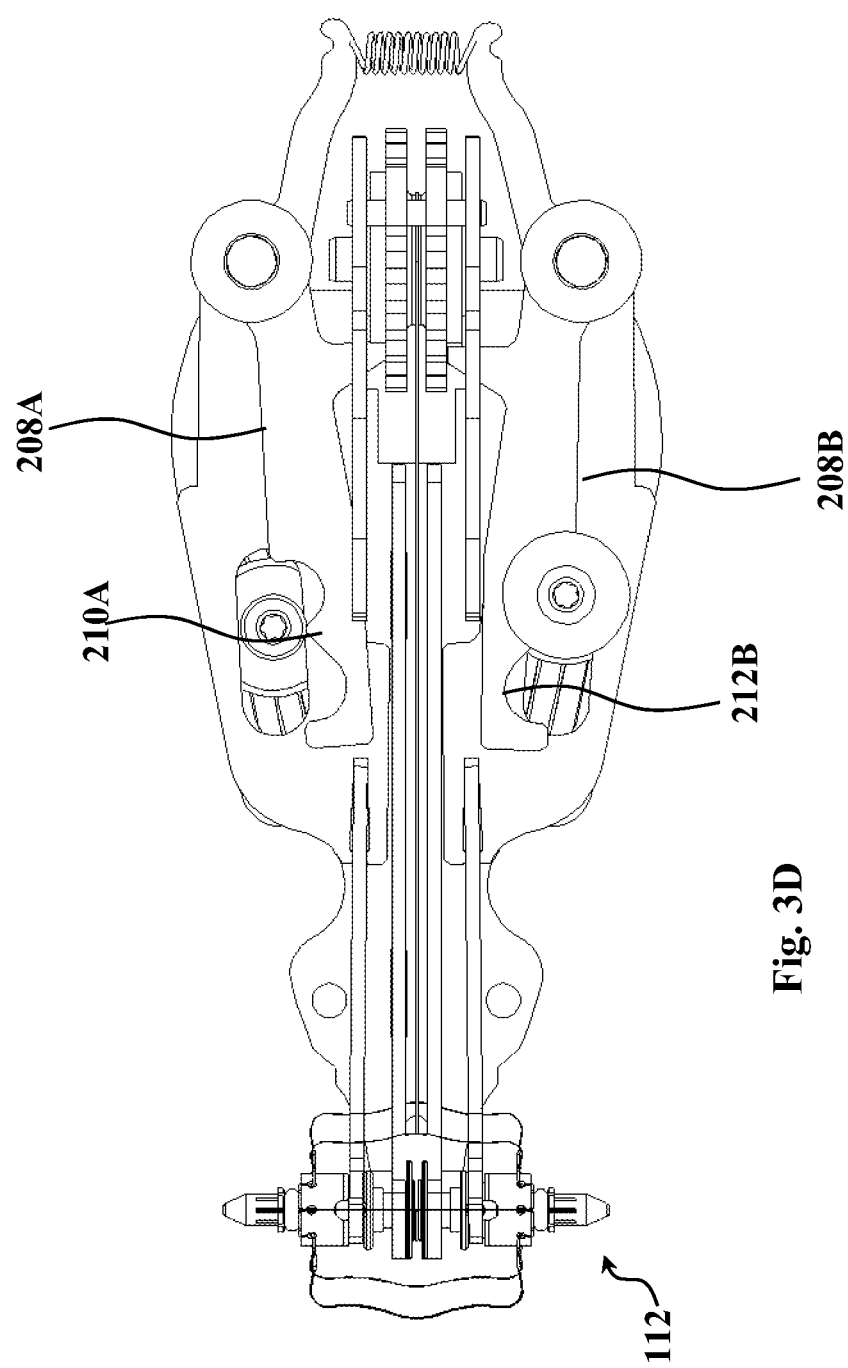
Figure 4A:
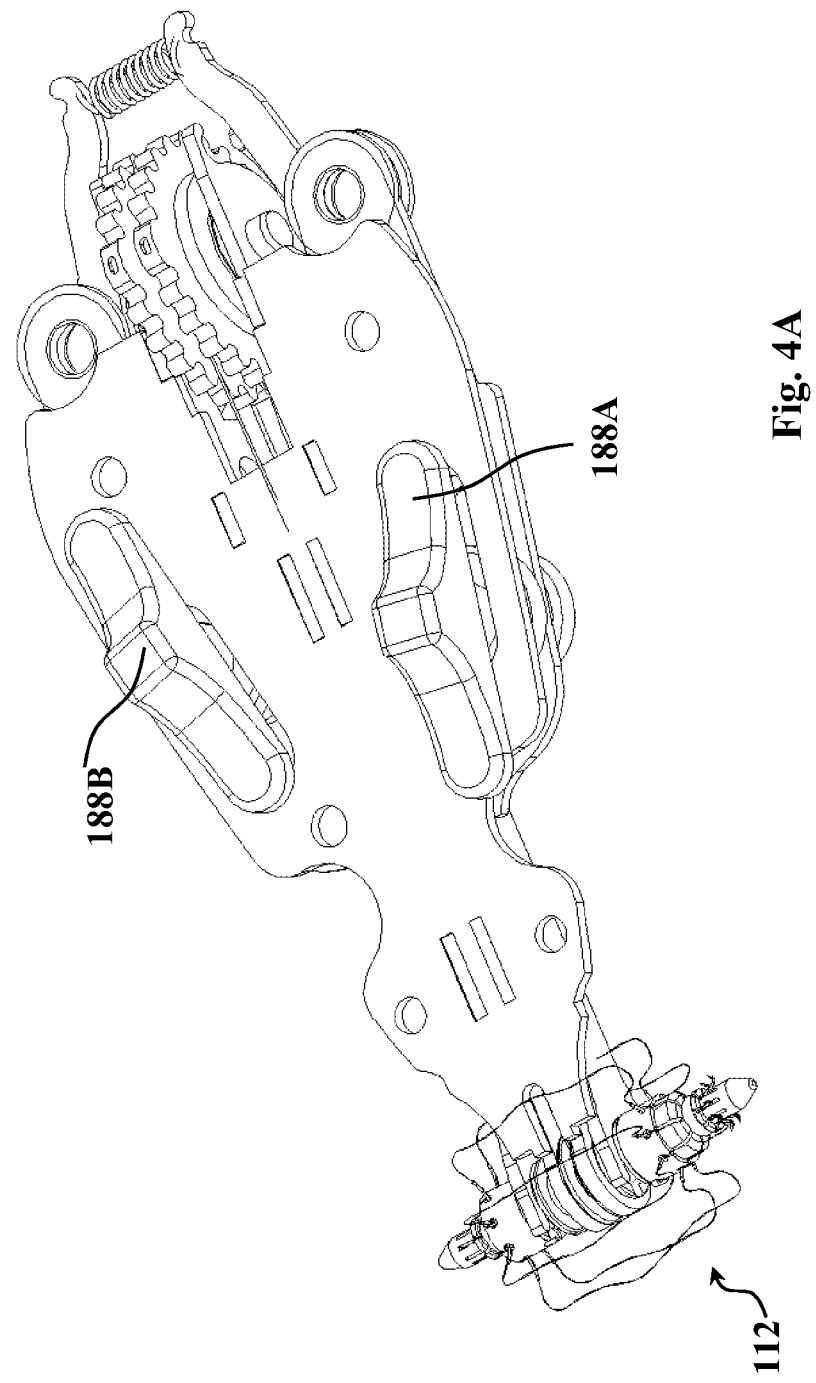
FIGS. 4A and 4B are, respective, perspective and planar top views of the system with one of the needle manipulation elements being at its inner position and the needles at their piercing state.
Figure 4B:
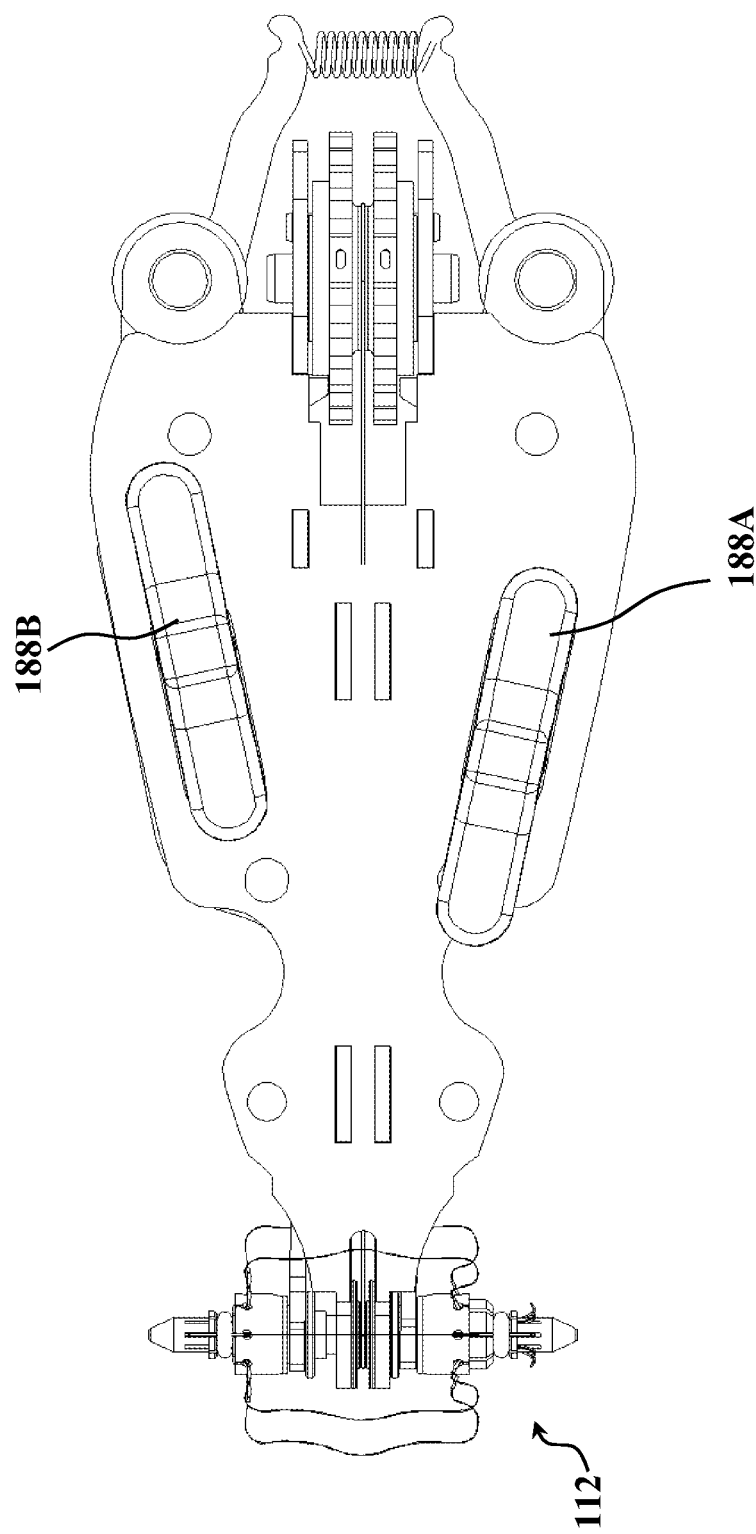
Figure 4D:
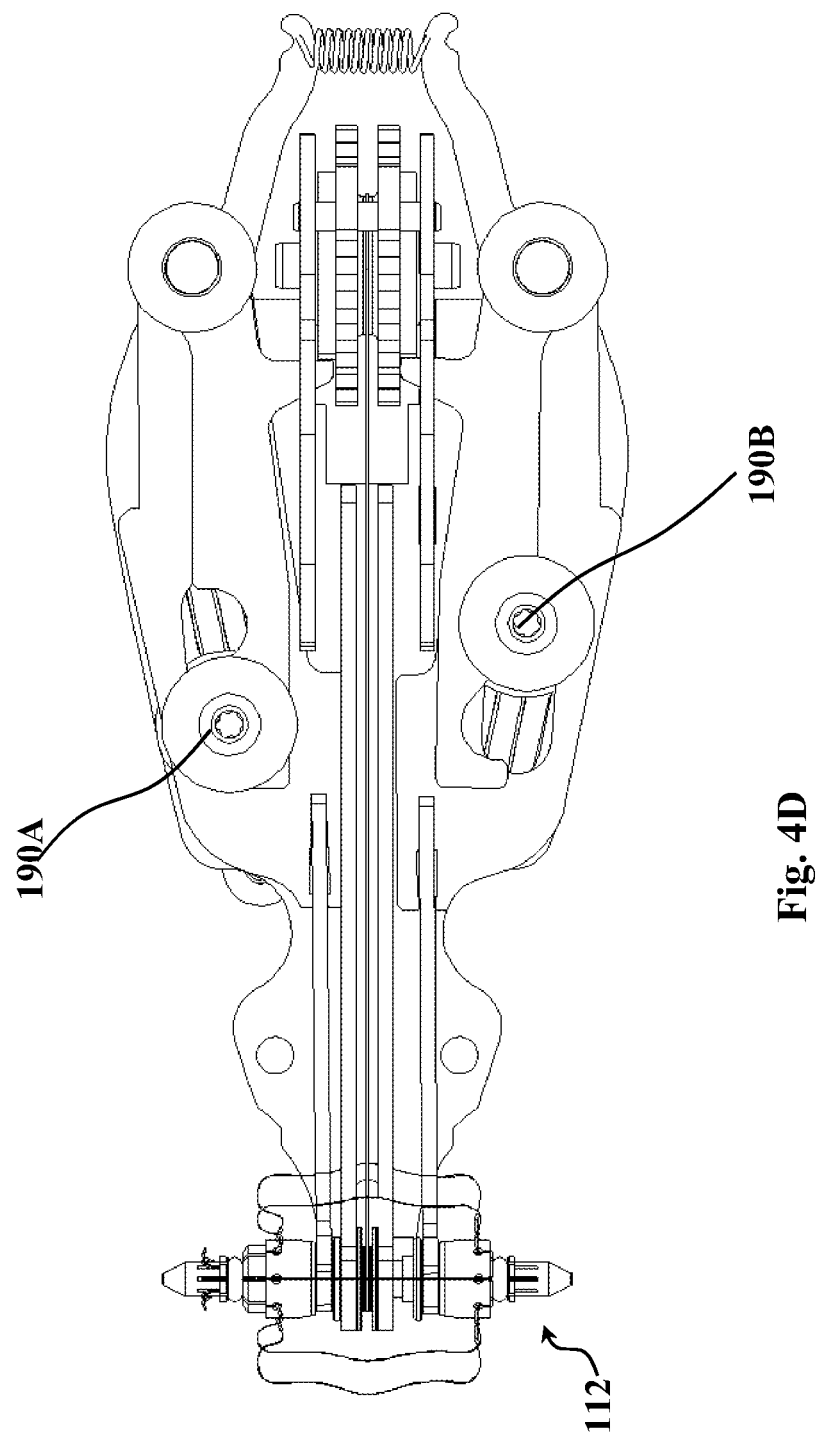

Referring to FIGS. 2A-2C, coupling arrangement 112 has some features and general operational principles similar to those described in WO 2020/157753. The coupling arrangement 112 includes a coupling body 113 with two axial coupling members 114A, 114B and defining a coupling axis 116. Each of the coupling members 114A, 114B has a frustum conical stump-coupling axial projection 118A, 118B, respectively, and is configured for independent coupling with a stump of a tubular organ (not shown), by pulling walls of the stump over the external face of the projections 118A, 118B into a suturing state. Defined in the coupling members are first and second sets of open channels 120A, 120B, arranged in an axially symmetric manner about the coupling axis 116.

Figure 6B:
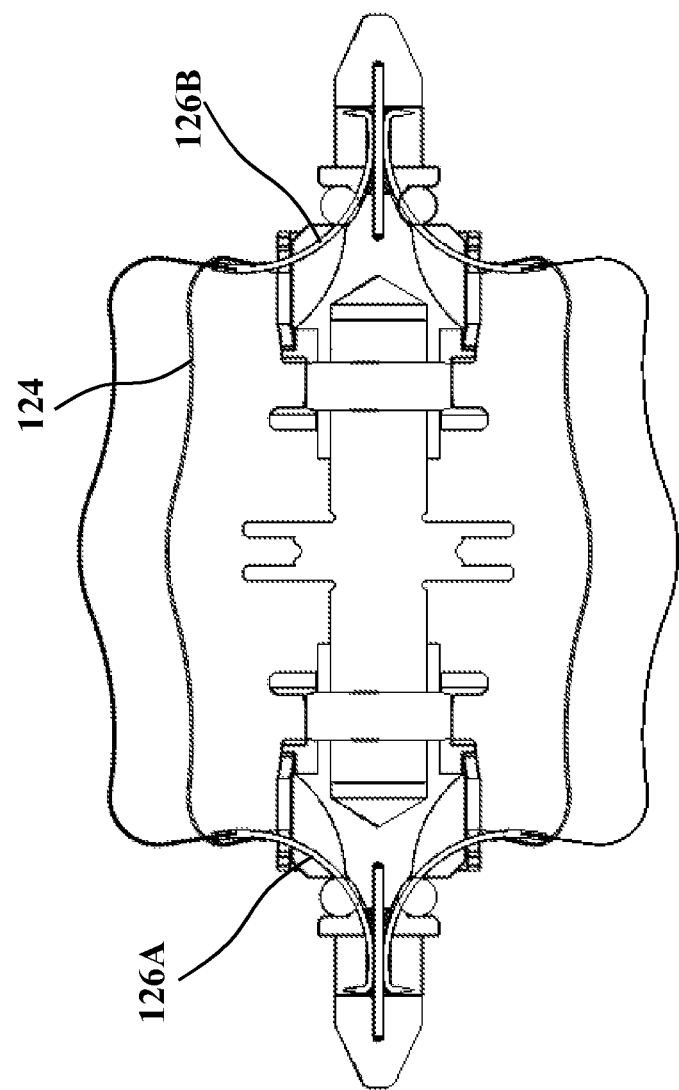
Figure 6C:
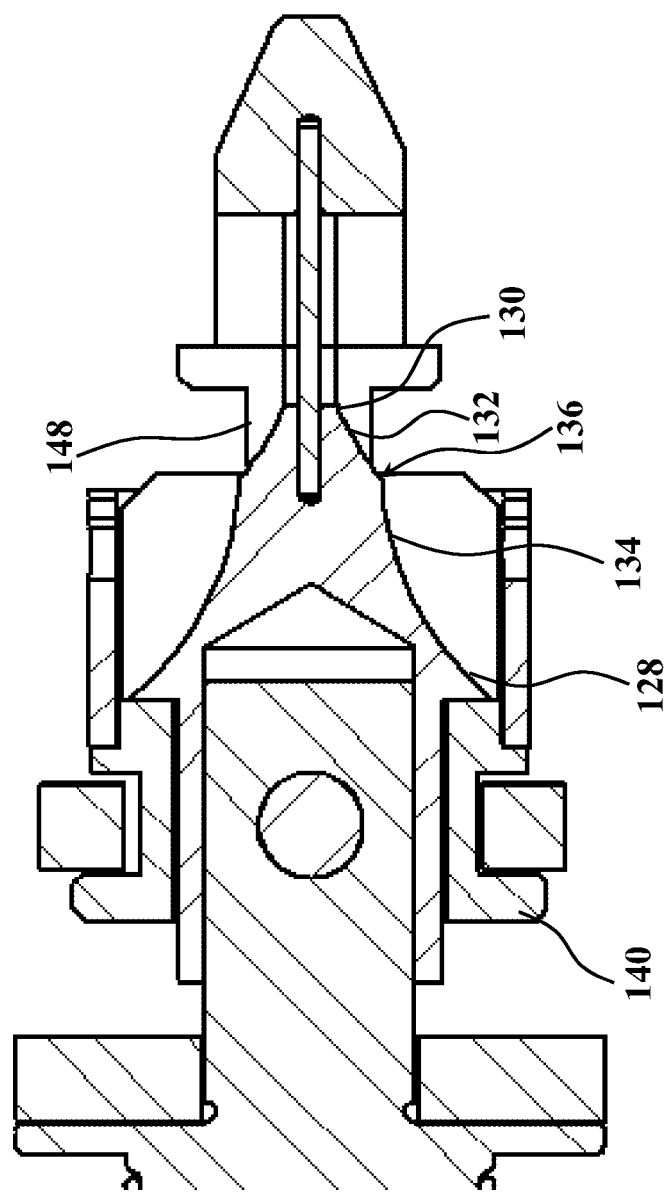
FIG. 6C is an enlarge cross-sectional view of one side of the coupling assembly of FIGS. 6A-6B.
Figure 9:
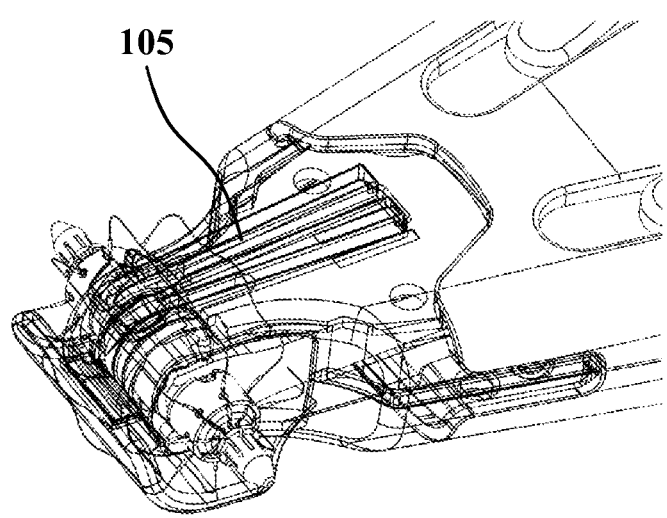
FIG. 9 is a closeup view of the front portion of the device of FIG. 1, in which the threads' storing element can be better seen.

The structure of the coupling arrangement 112 is shown in FIGS. 6A-6C. Seen are a plurality of suturing units 122, each suturing unit 122 being composed of suturing threads 124 linking between pairs of first and second curved needles 126A, 126B, respectively. The suturing threads are represented schematically and, for ease of illustration, are not shown at their full length. The suturing threads can be (and usually are) longer than shown. In order to avoid entanglement before or during use, the threads are stored in a threads' storing unit 105, shown in a closeup view in FIG. 9.

The first and second needles are arranged respectively in the first and second sets of open channels 120A, 120B. As seen in the cross-sectional view of FIGS. 6B-6C, each open channel 120 extends between a rear channel end 128 and a front channel end 130 and defines a channel axis parallel to coupling axis 116. The needles of a suturing unit are accommodated in opposite counterpart open channels that are along the same channel axis.

Each channel 120 is defined between sidewalls and a bottom wall, that has a curved front wall portion 132 and a curved rear wall portion 134, the curvatures of portions 132 and 134 being offset, and separated by a pivot point 136.

Figure 7A:
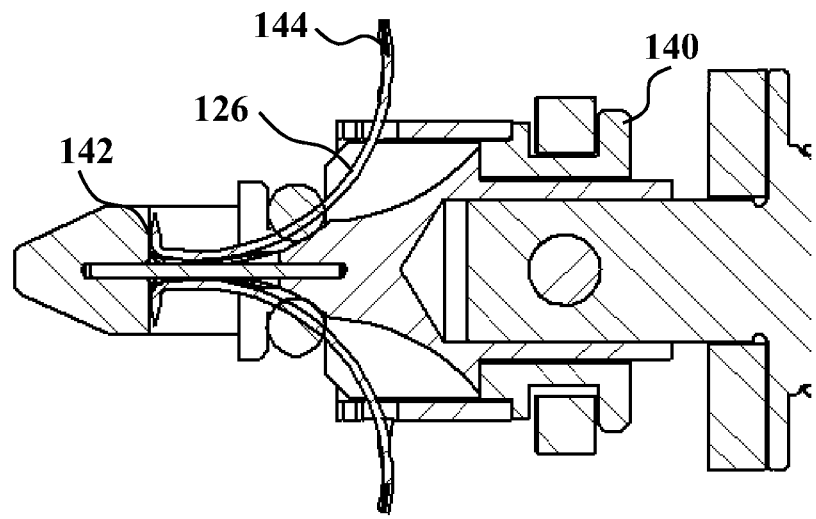
FIGS. 7A and 7B are cross-sectional views of the needles in a non-piercing and a piercing position, respectively.
Figure 7B:
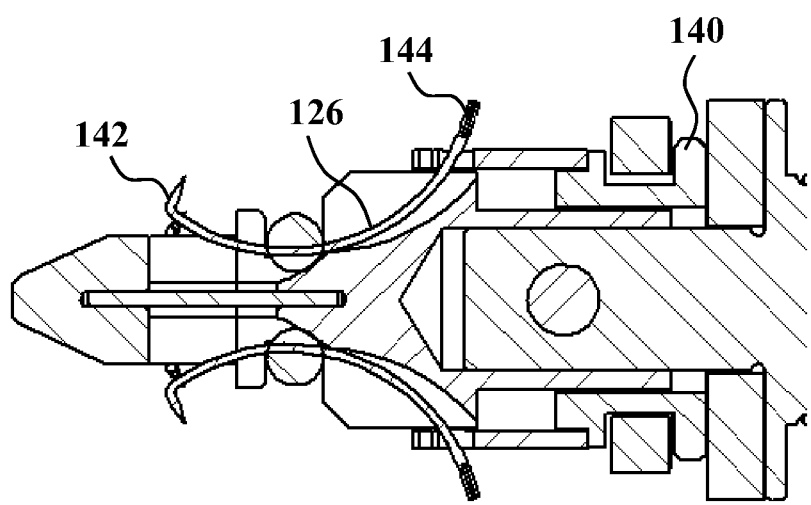

The coupling arrangement has first and second needle manipulation elements 140A, 140B, respectively, that are configured as a sleeve over body 113 and can be axially displaced between an outer position (seen in FIGS. 6A and 6B) and an inner position closer to the middle of the coupling arrangement. As illustrated in FIGS. 7A and 7B, such displacement causes needle extraction in the manner to be described.

Each needle has a tipped front 142 and a rear portion 144, with the suture 124 linking between two rear portions of a pair of needles in a suturing unit.

Each rear portion 144 of the needles 126 is held by the needles' manipulation element 140. Manipulation elements 140 are fitted onto body 113 of the coupling arrangement and each being inwardly axially displaceable from its initial position seen in FIG. 7A towards a mid-body portion to the position shown in FIG. 7B.

When the needle manipulation element 140 is in its outer position (FIG. 7A), the front portion of each needle rests against the front wall portion 132 and the rear portion of the needle's rear portion 144 extends out of the channel 120, maintaining tipped front 142 within the channel. Once the needle manipulation element 140 is displaced into the inner position (FIG. 7B), the axial displacement pivots the needle 126 about the pivot point 136 to bring the needle to rest against the rear wall portion 134. The pivotal displacement causes the tipped front 142 of the needle to exit the channel 120 to pierce through the stump walls in a suturing state.

The curvature of the front bottom wall portion 132 and also that of the rear bottom wall portion 134 of the channel 120, and hence also that of the needle 126, is typically circular, namely being arched and tracing a section of an imaginary curvature (e.g. circle) defined about a curvature center (not shown), the bottom wall of the channel's front portion being arched about an imaginary front curvature center and the rear portion of the channel being arched about an imaginary rear curvature center, the rear curvature center being rearward offset vis-à-vis the front curvature center. It should be pointed out that an arched bottom wall tracing a section of an imaginary circle is but an example, and the curvature may have other trajectories, e.g. hyperbolic, parabolic, etc.

Figure 8:
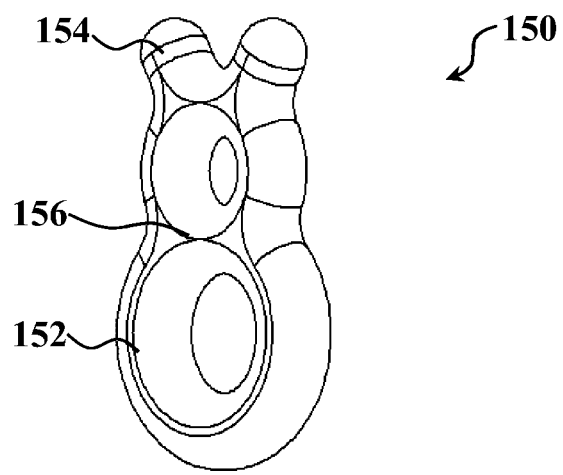
FIG. 8 is a perspective view of a retaining element according to an embodiment of this disclosure.

A circumferential groove 148 formed on the outer face of manipulation element 140, accommodates a retaining element 150, which maintains the needles within the channels 120 during movement thereof, and can be cut and removed after the needles pierce the stump walls. The retaining element, seen in FIG. 8, has a ring portion 152 and an integral gripping portion 154 permitting the medical practitioner to pull thereon for removal, and a notch 156 for ease of cutting of the ring. After cutting, the needles are freed from the coupling member.

Turning back to FIGS. 2A-5C, the device body 106, the elements and function thereof will now be described. Fitted within a rear end of device body 106 is a wheel element 108, rotatable about an axel 160 fixed in wheel frame 161, being parallel to coupling axis 116 and having a circular groove 162 that accommodates a closed-loop band or wire 164 that extends to and fitted within groove 166 in coupling body 113. Thus, through rotation of wheel element 108, the coupling body 113 is made to rotate in the same circular direction, to permit the practitioner access to all needles after they are made to pierce through the stump walls. Wheel element 108 has a "zero position" marking 107, as will be explained further below, this is the position in which the rotation of the wheel element is arrested by wheel engaging levers. To avoid the band 164 to slip under applied torque, it is possible to form a transverse bore within the groove 162 that serves as an anchor for the band or wire: the band/wire 164 is inserted through the bore and then looped around the axel within groove 162, this engagement preventing such slipping.

Formed within body 106 is an actuator arrangement, generally designated 170. The actuator arrangement 170 is symmetric about a plane of symmetry extending along longitudinal axis 172 and perpendicular to the coupling axis 116. The actuator arrangement 170 has first and second arms 176A, 176B, having respective front portions 178A, 178B and rear portions 180A, 180B. The arms are pivotably coupled to the body about respective first and second pivots 182A, 182B that are parallel to the plane of symmetry. The front portions 178A, 178B are configured for coupling at their distal portion to the respective first and second needle manipulation element 140A, 140B. The pivotal movement of the arms from the initial state (shown in FIGS. 2A-2C) to the tissue-piercing state displaces the needle manipulation elements from the outer position to the inner position to thereby cause needle extraction. For example, the movement of arm 176A along arched path 184A causes displacement of needle manipulation element 140A to extract the needles, as shown in FIGS. 4A-4D.

The actuation arrangement 170 also includes actuation elements 110A, 110B, having respective external sliders 188A, 188B (slider 188A being removed from FIG. 2A for ease of viewing) and pins 190A, 190B that are reciprocally displaceable in the general proximal-to-distal direction. Washers 192 secure the pin in position. Defined in body 113 are first and second guiding grooves 194A, 194B, with respective pins 190A, 190B being received therein; whereby the guiding grooves guide the reciprocal movement of the actuation elements.

Pins 190A, 190B are also received within respective first and second arms grooves 196A, 196B, that are off-set via-a-vis the respective guiding grooves 194A, 194B. Consequently, the reciprocal displacement of the actuation elements causes the pivotal movement of respective arms 176A, 176B.

Figure 5A:
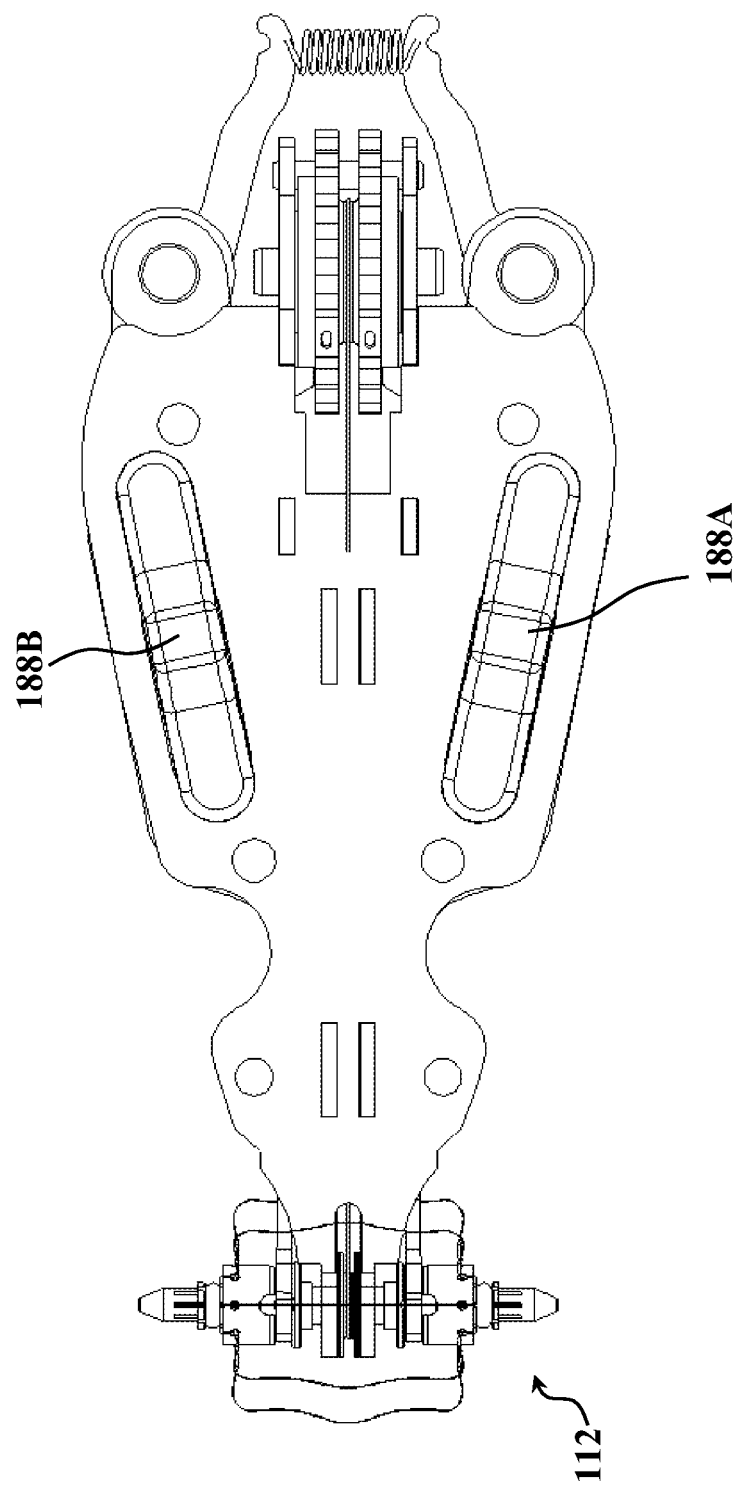
FIGS. 5A and 5B are, respectively, top and bottom perspective views, with the lever being in the blocking state, preventing rotation of the wheel.
Figure 5B:
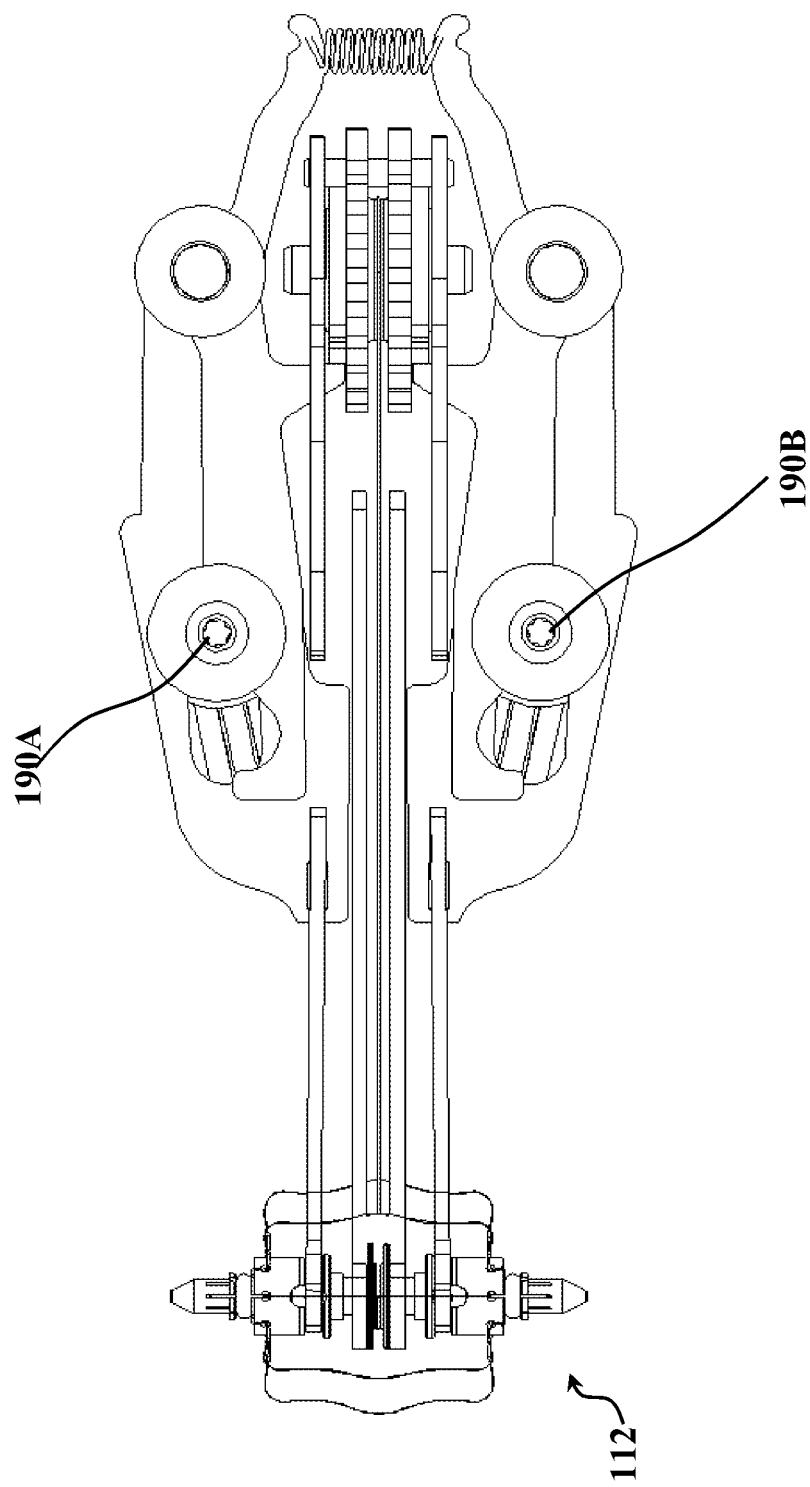
Figure 5C:
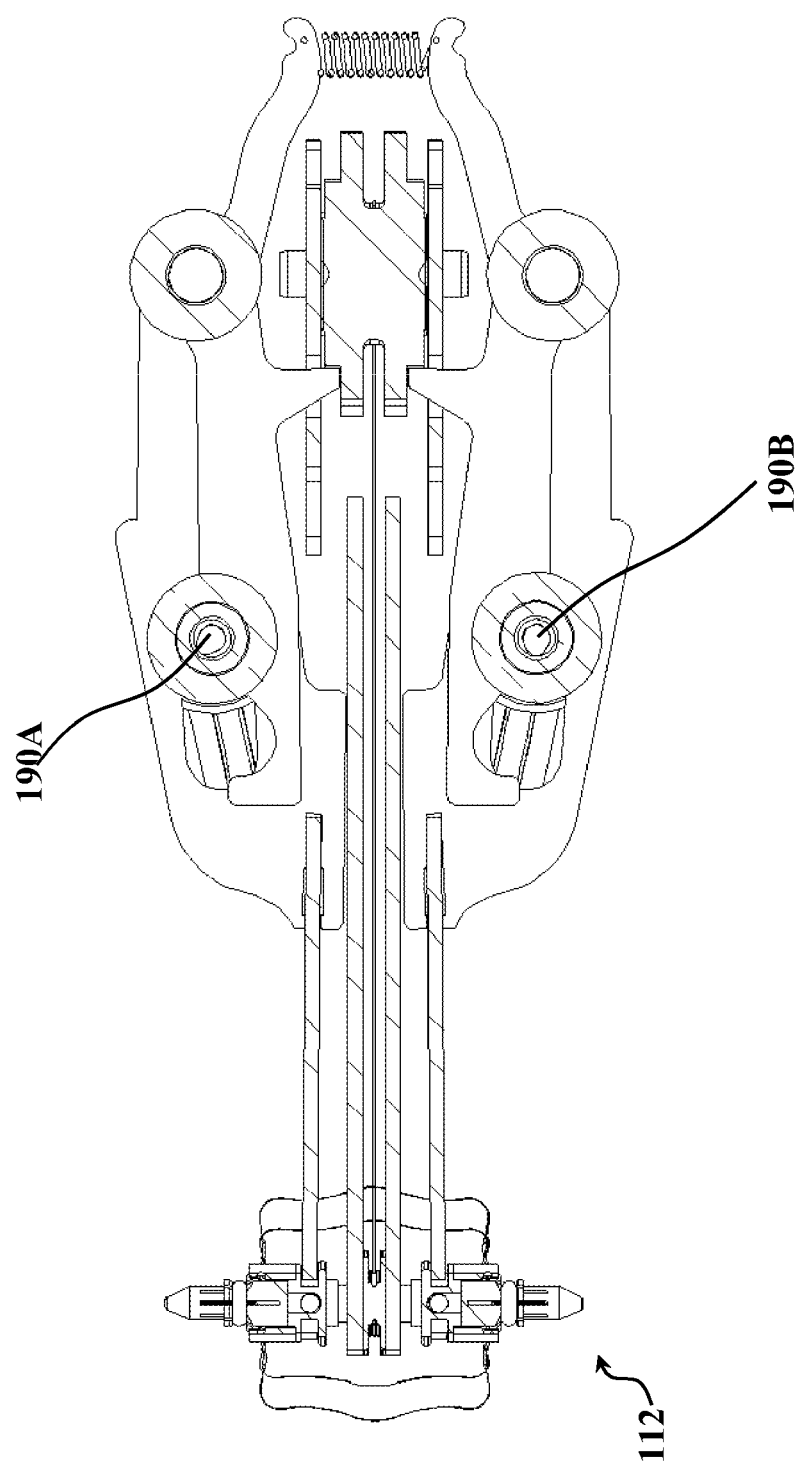
FIG. 5C is a planar cross-section of the device of FIG. 5B.

The anastomosis device also includes first and second wheel-engaging levers 198A, 198B, that are also pivot about respective pivots 182A, 182B. Levers 198A, 198B have ends portions 200A, 200B that are coupled to one another through spring 202 that biases the levers into a wheel unblocking state to be described below. The levers 198A, 198B have respective inwardly extending protrusions 204A, 204B, that extend through openings in wheel frame 161 toward the wheel element 108 and are configured for being received within respective receptacles 206A, 206B defined in wheel element 108. The arrangement is such that protrusions 204A, 204B can be received with receptacles 206A, 206B only when the wheel element 108 is in said Zero position. Levers 198A, 198B have respective bearing edges 208A, 208B, opposite the protrusions that bear onto pins 190A, 190B. The bearing edges have displacement arresting portions 210A, 210B (best seen in FIGS. 3A-3D), configured such that displacement of the pin 190 in the proximal-to-distal direction induces movement of the lever into the blocking state, such movement being disabled when the wheel element 108 is not in the Zero position (as seen in FIGS. 5A-5C). When the wheel 108 is in the Zero position this displacement is enabled and, once pins is displaced distally along the proximal-to-distal direction beyond the arresting portion 210, recesses 212A, 212B permit the levers to pivot into the unblocking state, by the urging force of spring 202 to thereby permit rotation of wheel element 108. This ensures that the extraction of the needles in coupling arrangement 112 occurs only when the wheel is in the Zero position, thereby ensuring axial alignment of the needle in the two stumps. The sequence shown in FIGS. 2A-4D shows such operational procedure for side "A" of the system, for extraction of needles 126A from the coupling member 114A.

A similar sequence occurs when displacing the actuation elements in the distal-to-proximal direction, a displacement that is disabled when the wheel is not in the Zero position.

The invention claimed is:

1. Anastomosis system for joining two stumps of a tubular organ, comprising:
   a coupling device with a body and a housing, a coupling assembly linked to the body, a plurality of suturing units within the coupling assembly and an actuator arrangement formed within the device;
   the coupling assembly that comprises
      a first and second axial coupling members defining a coupling axis, having two opposite, respective, first and second stump-coupling axial projections, each of the projections being configured for independent coupling with one of the stumps by pulling walls of the stump over external surface thereof to a suturing state in which the stump walls cover a stump-engaging portion thereof,
      two opposite sets of first and second open channels in said first and second stump-coupling members, respectively, arranged in an axially-symmetric manner about the coupling axis, each of the channels (i) extending between a rear channel end in stump-coupling member and a front channel end in the stump-engaging portion of the projection to define a channel axis, (ii) being defined between side walls and a bottom wall that has curved front wall portion and a curved rear wall portion, the curvatures of the two portions being offset and separated by a pivot point, and (iii) having a counterpart channel in the opposite set that extends along the same channel axis, and comprises first and second needle manipulation elements in the first and second stump-coupling members, respectively, each being axially displaceable between an outer position more proximal to said stump-coupling projection and inner position;

each of the plurality of suturing units comprises a suturing thread and two curved suturing needles, each with a tipped front and a thread-coupled rear that is coupled to the thread, the suturing needles being each accommodated within one of the channels, with one of the suturing needles of each unit being accommodated in a channel of one of said stump-coupling members and the other suturing needle of the unit in the counterpart channel in the other of said stump-coupling members, when the needle manipulation element is in its outer position, the front portion of each needle rests against the front wall portion and the rear end of the needle extending out of the channel, and the rear end of the needle being coupled to the needle manipulation element such that upon the axial displacement of said element from the outer position to the inner position, the needle pivots about said pivot point to rest against the rear wall portion, thereby pivotally displacing the tipped front of the needle out of said channel to pierce through the stump walls when in said suturing state;

the actuator arrangement being symmetric about a plane of symmetry substantially perpendicular to the coupling axis of the coupling assembly, having a first and second arms, pivotally fixed to the body about, respective, first and second pivot axes that are essentially parallel to the plane of symmetry, each configured for coupling at their distal portion to the respective, first and second needle manipulation elements, and, independently, moving each of the arms from an initial state to a tissue piercing state, causing a distal portion of the respective arm to move towards the other to axially displace the respective needle manipulation element from the outer to the inner position, and having first and second actuation elements, each being independently reciprocally displaceable generally in the proximal-distal direction, and, respectively, associated with the first and second arms, to cause, during such reciprocation, the arms to pivot between a rest and an actuating state inducing the, respective, needle manipulation elements to displace between the outer position and the inner position.

2. The anastomosis system of claim 1, wherein displacement of the actuation element in the proximal to distal direction causes the arms to pivot between said rest and said actuation state, respectively.

3. The anastomosis system of claim 1, wherein the first and second actuation elements have, respective, first and second pins received and reciprocate within, respective, first and second guiding grooves defined within the body.

4. The anastomosis system of claim 3, wherein the first and second pins being also received within, respective, first and second arm grooves defined within the, respective, first and second arms, each of the arm grooves being offset vis-à-vis the respective guiding groove, whereby the reciprocation of the actuating element induces pivotal movement of the respective arm.

5. The anastomosis device of claim 1, wherein said first and second pivot axes are at rear end portions of the arms.

6. The anastomosis system of claim 1, comprising a wheel element rotatable about a wheel axis essentially parallel to the coupling axis and linked to the coupling assembly such that rotation of the wheel element causes rotation of the coupling assembly about the coupling axis.

7. The anastomosis system of claim 6, wherein the wheel element is linked to the coupling assembly through a closed-loop band or ring.

8. The anastomosis device of claim 6, comprising:

first and second wheel-engaging levers, independently pivotable between blocking state and an unblocking state about the, respective, first and second pivot axes, and having, respective, first and second protrusions extending laterally towards the wheel, the wheel having first and second receptacles configured to receive the, respective, first and second protrusions such that once received the wheel is rotatably fixed in a zero position.

9. The anastomosis device of claim 8, wherein the wheel-engaging lever is pivoted between the engaging and the releasing states by the displacement of the actuation element.

10. The anastomosis device of claim 9, wherein the pivotal movement of the wheel-engaging lever from the unblocking to the blocking state is against the biasing force of an urging element urging said lever to move into the unblocking state, the wheel-engaging lever has a bearing edge, opposite said protrusion, that bears onto said pin, the bearing edge having a displacement arresting portion configured such that the displacement of the pin in the proximal to distal direction induces a pivotal displacement of the lever into the blocking state.

11. The anastomosis device of claim 10, wherein the bearing edge comprises a recess distal to said displacement arresting portion that permits the wheel-engaging lever to pivotally displace into the unblocking state, and the displacement arresting portion is configured such that the displacement of the pin in the distal to proximal direction induces a pivotal displacement of the lever into the blocking state.

12. The anastomosis arrangement of claim 1, comprising a retaining element for retaining the suturing needles within the channels.

13. The anastomosis arrangement of claim 12, wherein the retaining element is an elastic ring accommodated in a circumferential groove defined on the stump-coupling projection.

14. The anastomosis arrangement of claim 13, wherein, the elastic ring has a diameter such that it can fit snugly into the circumferential groove, and has an integral gripping portion for gripping and pulling a portion of the ring out of the circumferential groove.

15. The arrangement of claim 14, wherein the elastic ring comprises a notch for cutting the ring.

* * * * *